US010816804B2

United States Patent
Martinez et al.

(10) Patent No.: US 10,816,804 B2
(45) Date of Patent: Oct. 27, 2020

(54) NEAR-EYE DISPLAY SYSTEM WITH POLARIZATION-BASED OPTICAL PATH FOLDING AND VARIABLE FOCUS CATADIOPTRIC LENS ASSEMBLY

(71) Applicant: Google LLC, Mountain View, CA (US)

(72) Inventors: Oscar Martinez, Mountain View, CA (US); Yi Qin, Mountain View, CA (US); Jerome Carollo, Mountain View, CA (US); Xinda Hu, Mountain View, CA (US); Serge Bierhuizen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 126 days.

(21) Appl. No.: 16/119,026

(22) Filed: Aug. 31, 2018

(65) Prior Publication Data

US 2020/0073123 A1     Mar. 5, 2020

(51) Int. Cl.
*G02B 27/01* (2006.01)
*G02B 7/04* (2006.01)
*G02B 27/28* (2006.01)

(52) U.S. Cl.
CPC .......... *G02B 27/0172* (2013.01); *G02B 7/04* (2013.01); *G02B 27/0179* (2013.01); *G02B 27/288* (2013.01); *G02B 2027/0138* (2013.01); *G02B 2027/0187* (2013.01)

(58) Field of Classification Search
CPC .............. G02B 27/0172; G02B 27/123; G02B 27/144; G02B 27/283; G02B 27/286; G02B 30/25; G02B 2027/011; G02B 2027/0134; G02B 2027/0136; G02B 2027/0178;
(Continued)

(56) References Cited

U.S. PATENT DOCUMENTS

| | | |
|---|---|---|
| 3,305,294 A | 2/1967 | Alvarez et al. |
| 5,715,023 A * | 2/1998 | Hoppe ................ G02B 5/3016 349/11 |

(Continued)

FOREIGN PATENT DOCUMENTS

DE     102013100680 A1     7/2014

OTHER PUBLICATIONS

U.S. Appl. No. 15/954,172, filed Apr. 16, 2018, listing Yi Qin et al. as inventors, entitled "Compact Year-Eye Optical System Including a Refractive Beam-Splitting Convex Lense".
(Continued)

*Primary Examiner* — Balram T Parbadia

(57) ABSTRACT

A near-eye display system includes an optical system facing a display panel. The optical system includes an input filter, and output filter, and a variable-power catadioptric lens assembly disposed between the input and output filters. The input and output filters are configured, along with the catadioptric lens assembly to fold a path of display light from the display panel to a user's eye. The catadioptric lens assembly includes two or more lens elements disposed along an optical axis, each lens element having at least one surface with a freeform curvature. One of the lens elements is configured to be laterally translated relative to the other lens elements so as to change an optical power of the catadioptric lens assembly.

24 Claims, 9 Drawing Sheets

(58) Field of Classification Search
CPC ........ G02B 27/01; G02B 27/14; G02B 27/28; G02B 27/12
See application file for complete search history.

(56) References Cited

U.S. PATENT DOCUMENTS

| | | | | |
|---|---|---|---|---|
| 5,966,242 | A * | 10/1999 | Yamanaka | G02B 27/0172 359/618 |
| 6,075,651 | A * | 6/2000 | Hoppe | G02B 27/0172 359/15 |
| 6,304,303 | B1 * | 10/2001 | Yamanaka | G02B 5/3016 349/13 |
| 8,493,520 | B2 | 7/2013 | Gay et al. | |
| 2014/0211148 | A1 | 7/2014 | Crosby et al. | |
| 2015/0378074 | A1 | 12/2015 | Kollin et al. | |
| 2016/0213464 | A1 * | 7/2016 | Fukuma | A61F 2/1624 |
| 2016/0219269 | A1 | 7/2016 | Tekolste | |
| 2017/0227770 | A1 | 8/2017 | Carollo et al. | |
| 2017/0262054 | A1 * | 9/2017 | Lanman | G06F 3/011 |

OTHER PUBLICATIONS

International Search Report and Written Opinion dated Nov. 28, 2019 for corresponding International Application No. PCT/US2019/047821, 15 pages.

Barton, I.M. et al., "Diffractive Alvarez lens", Optics Letters, vol. 25, No. 1; ISSN: 0146-9592; Jan. 1, 2000; 3 pages.

* cited by examiner

NEAR-EYE DISPLAY SYSTEM WITH POLARIZATION-BASED OPTICAL PATH FOLDING AND VARIABLE FOCUS CATADIOPTRIC LENS ASSEMBLY

BACKGROUND

Immersive virtual reality (VR) and augmented reality (AR) systems typically utilize a head mounted display (HMD) device or other near-eye display system that presents stereoscopic imagery to the user so as to give a sense of presence in a three-dimensional (3D) scene. Such near-eye display devices typically employ at least one display panel to provide a left-eye display and a right-eye display, and an optical system to focus the entirety of each display on the corresponding eye. In conventional near-eye display systems, the optical system is focused a single fixed focal distance, which leads to the well-known problem of vergence-accommodation conflict and its deleterious effects on user comfort. While some conventional optical systems have been developed to provide a variable focus length to mitigate vergence accommodation conflict, these approaches often are either too thick to be implemented in an HMD device without causing user discomfort or provide too small of an aperture for sufficient focus tuning variation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
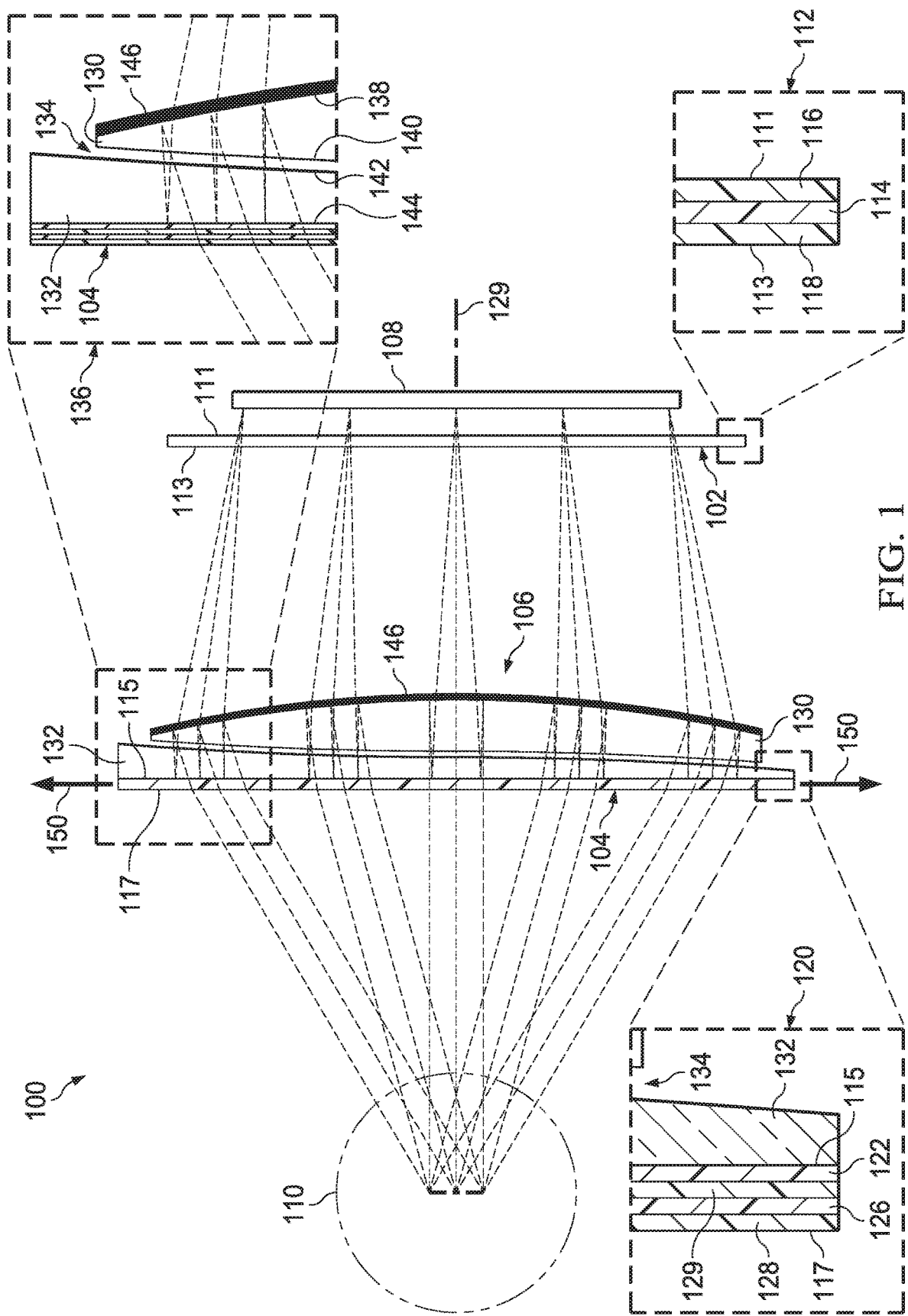
FIG. 1 illustrates a side cross-section view of an example of an optical system employing a two-element variable-focus catadioptric lens assembly for providing focus tuning according to some embodiments.

The inverse relationship between focal length and optical power typically results in relatively "thick" optical systems given the magnification parameters preferred for HMDs and other near-eye display systems. The fixed focal length typically provided by such optical systems also leads to vergence-accommodation conflict. Described herein are examples of optical systems that employ polarization filters and a catadioptric lens assembly to "fold" the light path and thus provide a more compact form factor for a given focal length, while also providing variable optical power, and thus allowing a near-eye display system implementing the optic system to vary, or "tune", the focal depth of the optical system so as to mitigate vergence-accommodation conflict.

In some embodiments, the optical system includes an input (display-side) filter, an output (eye-side) filter, and a variable-power catadioptric lens assembly disposed between the input and output filters. The catadioptric lens assembly includes a plurality of lens elements arranged along the optical axis of the lens assembly. The plurality of lens elements are arranged along an optical axis, with each lens element being separated from an adjacent lens element by a gap and the plurality of lens elements including a "movable" lens element configured to be laterally translated (that is, moved in a direction that is orthogonal to the optical axis of the lens assembly) relative to the other lens element(s) of the catadioptric lens assembly. Surfaces of two or more of the lens elements (including the movable lens element) have freeform curvatures that have a sag based on, for example, a cubic function. Accordingly, lateral translation of the movable lens element alters the profile, or "thickness" of the combination of lens elements, and thus varies the optical power of the combination of lens elements. The plurality of lens elements further includes a display-side lens element having a display-facing surface that is configured as a partial mirror (e.g., a 50/50 mirror).

With this configuration, unpolarized display light from a display panel is converted to light having a first circular polarization (e.g., right-handed circular polarization (RCP)) by the input polarization filter. The resulting light strikes the partial mirror of the display-side lens element, whereupon it is transmitted through the lens elements of the catadioptric lens assembly. The partial mirror at the display-facing surface of the lens element closest to the display panel permits transmission of this light through the catadioptric lens assembly with the first circular polarization to the output polarization filter. The output polarization filter reflects this light with the first circular polarization back into the catadioptric lens assembly, whereupon the once-reflected light is reflected back by the eye-side of the partial mirror of the display-side lens element. As part of reflecting this light, the partial mirror converts the light from the first circular polarization to a second circular polarization (e.g., left-handed circular polarization (LCP)). The twice-reflected light with this second circular polarization is then transmitted back through the lens elements of the catadioptric lens assembly to the output polarization filter. The output polarization filter is configured to permit transmission of light having the second circular polarization, and thus the twice-reflected light is transmitted through the output polarization filter in the direction of an expected position of a user's eye. Thus, the display light from the display panel transits the width of the plurality of lens elements of the catadioptric lens assembly three times, which thus effectively elongates the path of this display light from the display panel to the user's eye for a given focal length for which the catadioptric lens assembly is configured. Moreover, the focal length of the catadioptric lens assembly may be adjusted through lateral translation of the corresponding moveable lens element. This manipulation in turn tunes the overall focal length of the optical system to a focal depth that is more consistent with a depth of one or more objects represented in the image content of the display light, and thus better mitigating any potential vergence-accommodation conflict.

FIG. 1 illustrates an optical system 100 having a tunable focal length in accordance with some embodiments. The optical system 100 includes a first polarization filter 102 (hereinafter, "input filter 102"), a second polarization filter (hereinafter, "output filter 104"), and a catadioptric lens assembly (CLA) 106 disposed therebetween. The optical system 100 is disposed between a display panel 108 and an expected position of a user's eye 110, such that the input filter 102 faces the display panel 108 and the output filter 104 faces the eye 110. The input filter 102 is configured to transmit light incident on a display-facing side 111 to the opposing eye-facing side 113 and to convert this light to a first circular polarization (e.g., RCP) in the process. As illustrated by enlarged view 112, the input filter 102, in one embodiment, includes a quarter wave plate (QWP) layer 114 disposed between a linear polarizer (LP) layer 116 on the display-facing side 111 and an anti-reflection film layer 118 on the eye-facing side 113. Note that although not illustrated, the input filter 102 further may include a pressure-sensitive adhesive (PSA) layer disposed at the display-facing surface 111 of the LP layer 116 so as to allow the input filter 102 to be mounted directly on the coverglass of the display panel 108. With this configuration, the input filter 102 transmits incident unpolarized display light from the display panel 108 toward the CLA 106 from display-facing side 111 to eye-facing side 113, and in the process converts the unpolarized display light to the first circular polarization. The output filter 104 is configured to reflect light having the first circular polarization incident on a display-facing side 115 and to transmit light having a second circular polarization (e.g., LCP) incident on the display-facing side 115 to the opposing eye-facing side 117. As illustrated by enlarged view 120, in one embodiment the output filter 104 includes a QWP layer 122 at the display-facing side 115, a polarizing beam splitting (PBS) layer 124 adjacent to the QWP layer 122, an LP layer 126 adjacent to the PBS layer 124, and an anti-reflection film layer 128 adjacent to the LP layer 126 on the eye-facing side 117. With this configuration, light from the CLA 106 incident on the display-facing side 115 and having the first circular polarization is reflected back to the CLA 106, whereas light from the CLA 106 incident on the display-facing side 115 and having the second circular polarization is transmitted through to the eye-facing side 113 and then to the eye 110.

The CLA 106 includes a plurality of lens elements disposed along an optical axis 129 of the CLA 106 with a gap between each lens element. In the particular two-element implementation of FIG. 1, the CLA 106 includes a display-facing lens element 130 and an eye-facing lens element 132 separated along the optical axis 129 by a gap 134. The lens elements 130, 132 are composed of transparent low birefringence material so as to maintain polarization uniformity, such as certain optical plastics, optical glass, and the like. As illustrated by enlarged view 136, the display-facing lens element 130 has a display-facing surface 138 and an opposing eye-facing surface 140, and the eye-facing lens element 132 has a display-facing surface 142 and an opposing eye-facing surface 144, such that the opposing surfaces 140, 142 define the gap 134 separating the lens elements 130, 132.

The CLA 106 further includes a partial mirror 146 disposed at the display-facing surface 138 of the lens element 130. The partial mirror 146 may be implemented using, for example, metallic materials, dielectric materials, or combinations thereof, which may be formed using, for example, conventional thin film deposition techniques. The partial mirror 146 operates as, for example, a 50/50 mirror. Thus, as described in greater detail below with respect to FIG. 3, some (e.g., approximately 50% for a 50/50 mirror) of the incident display light is allowed to pass through the partial mirror 146 into the lens elements 130, 132, whereas some of the light reflected by the output filter 104 back into the lens elements 130, 132 is reflected back toward the output filter 104 through the lens elements 130, 132. Further as also illustrated by the enlarged view 136, in some embodiments the output filter 104 is laminated on, or otherwise disposed at, the eye-facing surface 144 of the display-side lens element 132. In other embodiments, the output filter 104 is offset and separate from the eye-facing surface 144.

In the optical system 100 of FIG. 1, the eye-facing surface 144 of the lens element 132 is a plano surface and the display-facing surface 138 of the lens element 130 is a rotationally symmetric asphere with a conic constant. The eye-facing surface 140 of the lens element 130 has a freeform curvature with a sag based on, for example, a cubic function (and which may be further based on higher-order terms so as to address certain optical aberrations or which may also have a linear term so as to reduce the surface sag). The opposing display-facing surface 142 of the lens element 132 likewise is a freeform curvature having a sag that likewise is based on, for example, a cubic function (and may be further based on higher-order terms) and which, in some embodiments, is the inverse complement to the sag of the eye-facing surface 140 such that when the lens elements 130, 132 are arranged in a default position, the gap 134 between the surfaces 140, 142 has a substantially constant width.

With this configuration, lateral translation of the lens element 132 relative to the lens element 130, that is, movement in one or more directions 150 that are orthogonal to the optical axis 129 while the lens element 130 remains in a fixed position relative to the optical axis 129, changes the optical profile, or thickness, of the combination of the lens elements 130, 132, and thus changes the optical power and focal length of the CLA 106 as well as the optical system 100 as a whole. Accordingly, as described in greater detail below, systems employing the optical system 100 further employ a mechanism to enact lateral translation of the lens element 132 relative to the lens element 130, and thereby adjusting the optical power of the CLA 106, so as to tune the focal length of the CLA 106 to better suit a corresponding depth parameter of each display image being displayed at the display panel 108.

Figure 2:
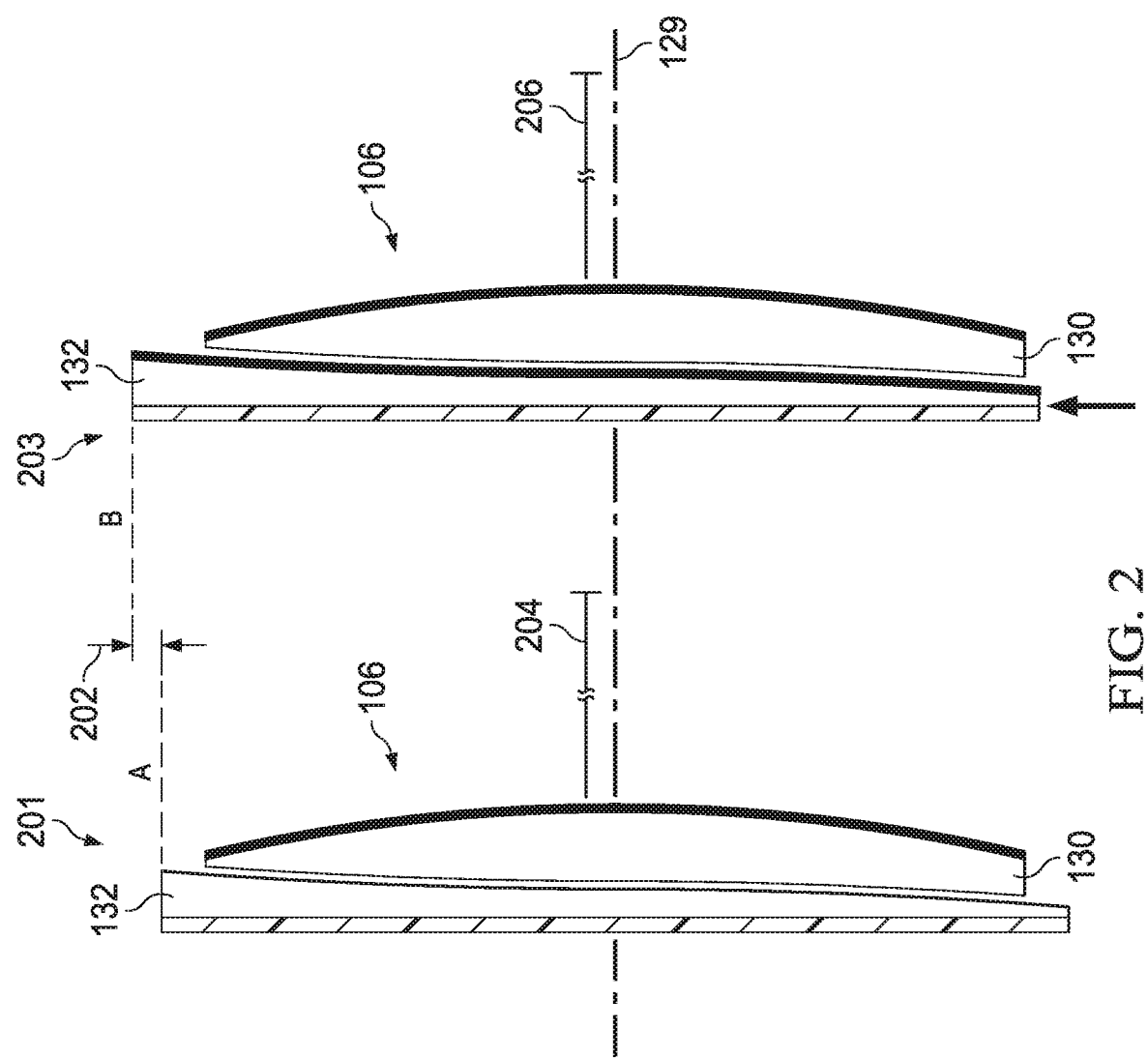
FIG. 2 illustrates focus tuning of a catadioptric lens assembly via lateral translation of a lens element relative to another lens element according to some embodiments.

FIG. 2 illustrates an example of this focus adjustment process. In cross-section view 201 the CLA 106 is configured so that the lens element 132 is positioned at position A relative to the lens element 130, which is fixed in position relative to the optical axis 129. The combination of the lens elements 130, 132 in this configuration provides the optical profile represented in view 201, and thus a corresponding optical power and focal length 204. As shown by view 203, the lens element 132 is then laterally translated by an amount 202 to position B relative to the lens element 130 and the optical axis 129. The combination of the lens elements 130, 132 in this revised configuration provides the revised optical profile represented in view 203, and thus a corresponding adjusted optical power and adjusted focal length 206.

Figure 3:
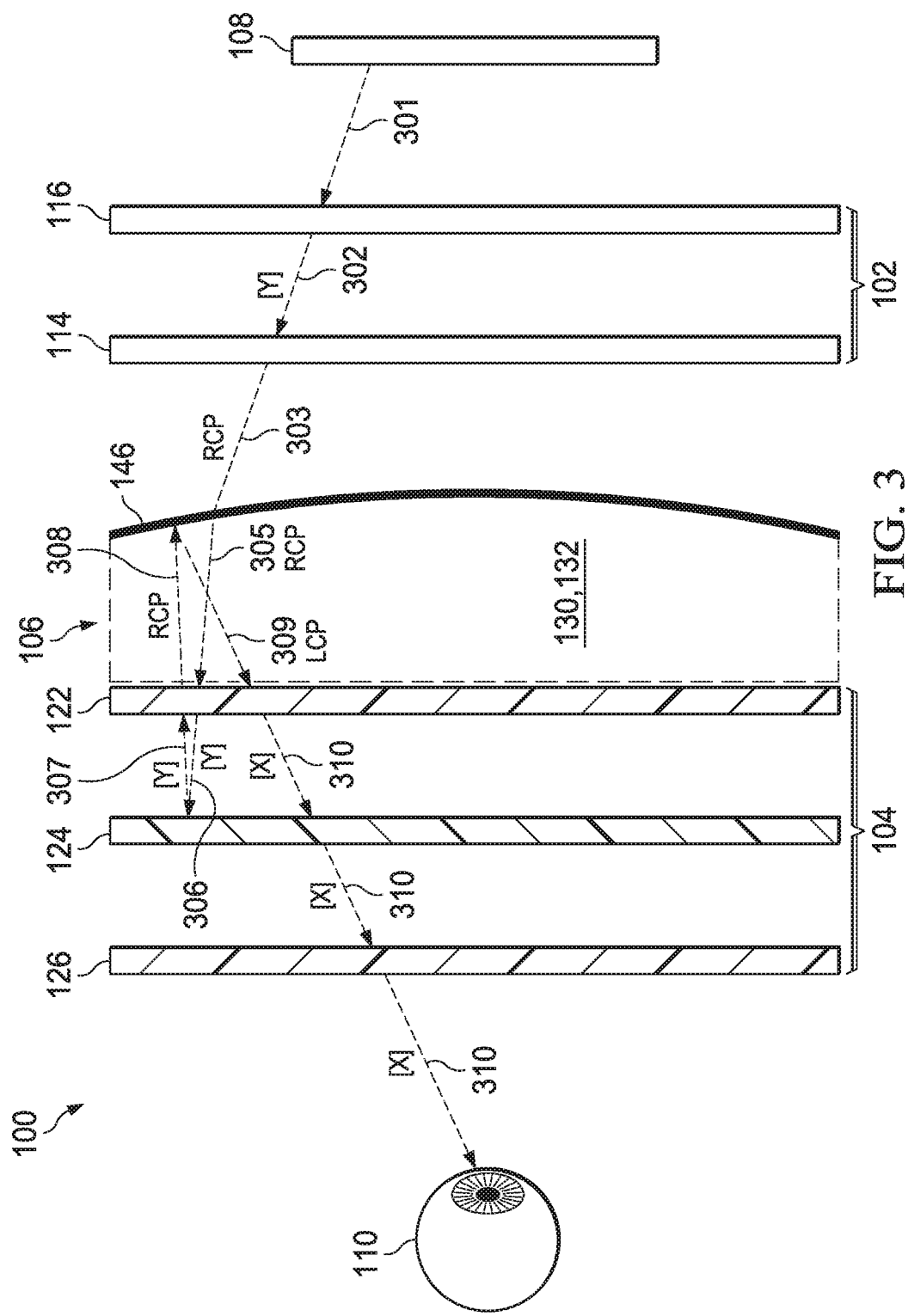
FIG. 3 illustrates an exploded cross-section view of the optical system of FIG. 1 illustrating a folded light path between a display panel and a user's eye according to some embodiments.

FIG. 3 illustrates an example path of a light ray from the display panel 108 to the user's eye 110 through the optical system 100. For purposes of illustration, the filters 102, 104 are depicted using exploded representations such that the individual layers of the respective filters are distanced from each other so as to facilitate clear identification of the light ray between each layer. Further, the anti-reflection film layers 118, 128 have been omitted from FIG. 3 for ease of discussion.

The display panel 108 is used to display a series of display images to the user's eye 110 via the optical system 100. Each displayed image is represented by emitted display light, including the depicted display light ray 301, which is unpolarized. The light ray 301 is transmitted through the LP layer 116 of the input filter 102, which converts the display light ray 301 to y-linear polarized light ray 302. The light ray 302 is transmitted through the QWP layer 114, which converts the light ray 302 to a light ray 303 with RCP (one embodiment of the first circular polarization). The light ray 303 is transmitted through the partial mirror 146 formed at the facing surface of the lens element 130, and the light ray 303 is refracted by the configuration of the lens elements 130, 132, resulting in a refracted light ray 305 that falls incident on the QWP layer 122 of the output filter 104. The QWP layer 122 transmits the refracted light ray 305 and converts the polarization to y-linear polarization in the process, resulting in light ray 306. The PBS layer 124, being configured to reflect light with y-linear polarization, reflects the light ray 306 back toward the QWP layer 122 as reflected light ray 307. The QWP layer 122 transmits this reflected light ray 307 and converts the polarization of the light ray to RCP in the process, resulting in reflected light ray 308, which travels through the lens elements 130, 132, falling incident on the eye-facing side of the partial mirror 146. As the reflected light ray 308 is RCP, the partial mirror 146 reflects the once-reflected light ray 308 and converts its polarization to LCP (one embodiment of the second circular polarization) in the process, resulting in twice-reflected light ray 309. The light ray 309 is transmitted through the lens elements 130, 132 (see FIG. 1) and falls incident on the QWP layer 122, whereupon it is transmitted through the QWP layer 122 and the polarization is changed from LCP to x-linearly polarized in the process. The resulting light ray 310 is transmitted through the PBS layer 124 and the LP layer 126 in the direction of the expected position of the user's eye 110.

The above-described light path is a folded light path in that polarization changes and selective light transmission/reflection properties of the layers of the filters 102, 104 and the partial mirror 146 are used to reflect the display light twice such that the display light traverses the combination of the lens elements 130, 132 three times, with the display light being refracted three times through each variable power surface, which enables a reduced freeform sag compared to other laterally-translating variable focus lenses. In addition to providing an effectively shorter focal length for a given optical power, the use of variable power on the reflective surfaces of the optical system 100 reduces the required sag for the surfaces 140, 142.

Figure 4:
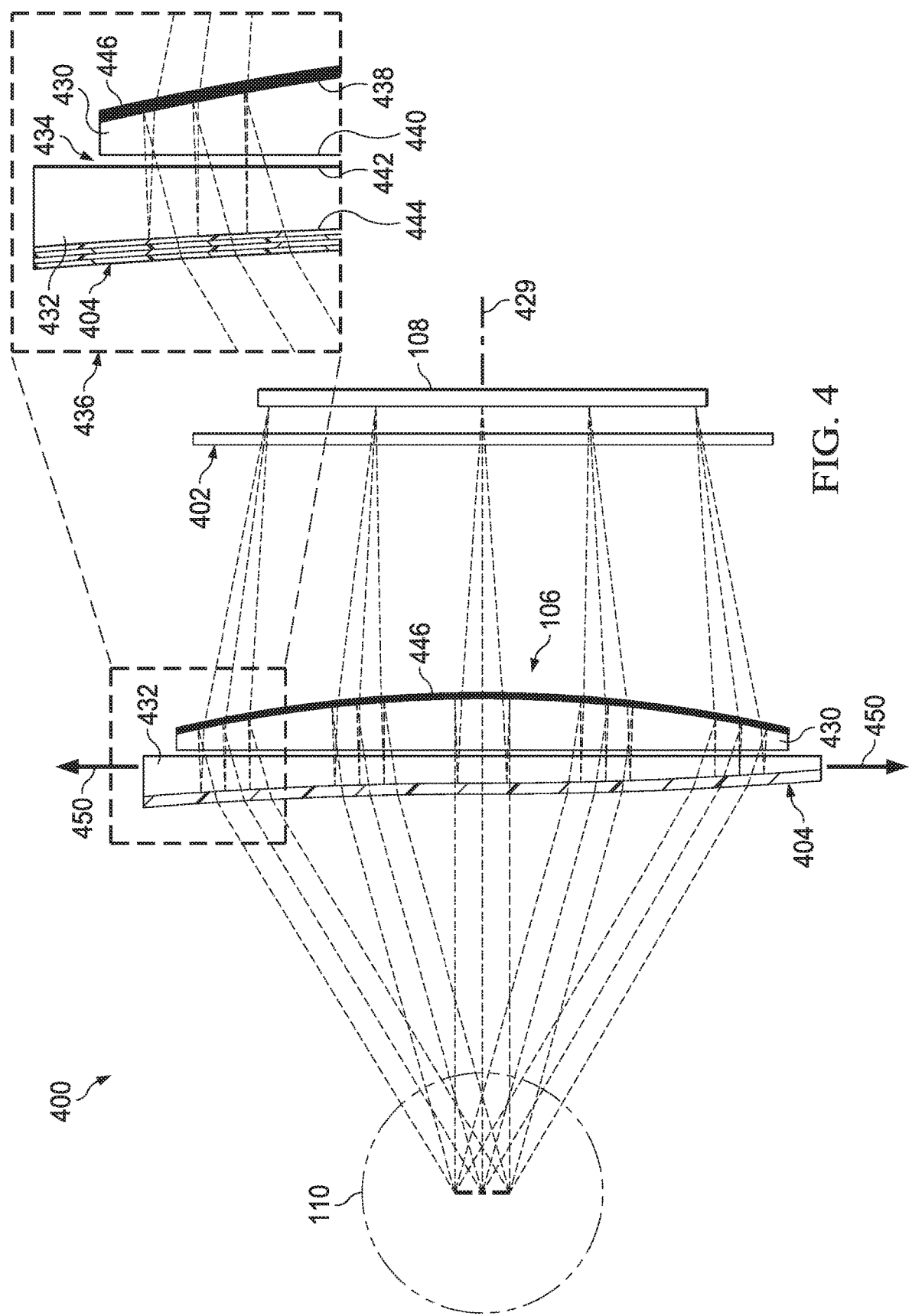
FIG. 4 illustrates a side cross-section view of another example of an optic system employing a two-element variable-focus catadioptric lens assembly for providing focus tuning according to some embodiments.

FIG. 4 illustrates another optical system 400 having a tunable focal length in accordance with some embodiments. The optical system 400 includes a first polarization filter 402 (hereinafter, "input filter 402"), a second polarization filter (hereinafter, "output filter 404"), and a catadioptric lens assembly (CLA) 406 disposed therebetween. The optical system 400 is disposed between the display panel 108 and an expected position of the user's eye 110, such that the input filter 402 faces the display panel 108 and the output filter 404 faces the eye 110. In one embodiment, the filters 402, 404 are configured with the same layers as filters 102, 104, respectively, of optical system 100, as described above.

The light path folding aspects and focus tuning through lateral translation of a lens element as described above apply as well to the optical system 400. Thus, as with the CLA 106 of FIG. 1, the CLA 406 includes two lens elements, a display-facing lens element 430 (first lens element) and an eye-facing lens element 432 (second lens element), disposed along an optical axis 429 of the CLA 406 with a gap 434 therebetween. As illustrated by enlarged view 436, the display-facing lens element 430 has a display-facing surface 438 and an opposing eye-facing surface 440, and the eye-facing lens element 432 has a display-facing surface 442 and an opposing eye-facing surface 444, such that the opposing surfaces 440, 442 define the gap 434 separating the lens elements 430, 432. In one embodiment, the output filter 404 is laminated on, or otherwise disposed at, the eye-facing surface 444. The CLA 406 further includes a partial mirror 446 disposed at the display-facing surface 438 of the lens element 430.

As with the CLA 106, a system employing the optical system 400 may implement a mechanism to laterally translate the lens element 432 in one or more directions 450 relative to the lens element 430 so as to change an optical profile, and thus optical power and focal length of the resulting configuration. However, in contrast to the CLA 106, rather than implementing the freeform surfaces that provide variable power on the opposing surfaces defining the gap between lens elements, the freeform surfaces are instead implemented on the external surfaces of the lens elements 430, 432. As such, the display-facing surface 438 of the lens element 430 comprises a freeform curvature having a sag based on, for example, an asphere plus a cubic function (further may be based on higher-order terms for addressing aberrations) and the eye-facing surface 444 of the lens element 432 comprises a freeform surface having a sag based on, for example, an asphere plus a cubic function (and likewise can be further based on higher-order terms). By placing the surfaces with sag that provide the variable optical power on the external surfaces, the opposing internal surfaces 440, 442 that define the gap 434 may be plano surfaces, and thus allowing the gap 434 to be planar, which reduces or eliminates mechanical interference issues. Moreover, as the gap 434 is planar, the gap 434 may be filled with an optical oil or other fluid as there is zero optical power from this region. This fluid can reduce ghost image artifacts from Fresnel reflections, and further may lubricate or otherwise facilitate rapid oscillation of the lens element 432.

Figure 5:
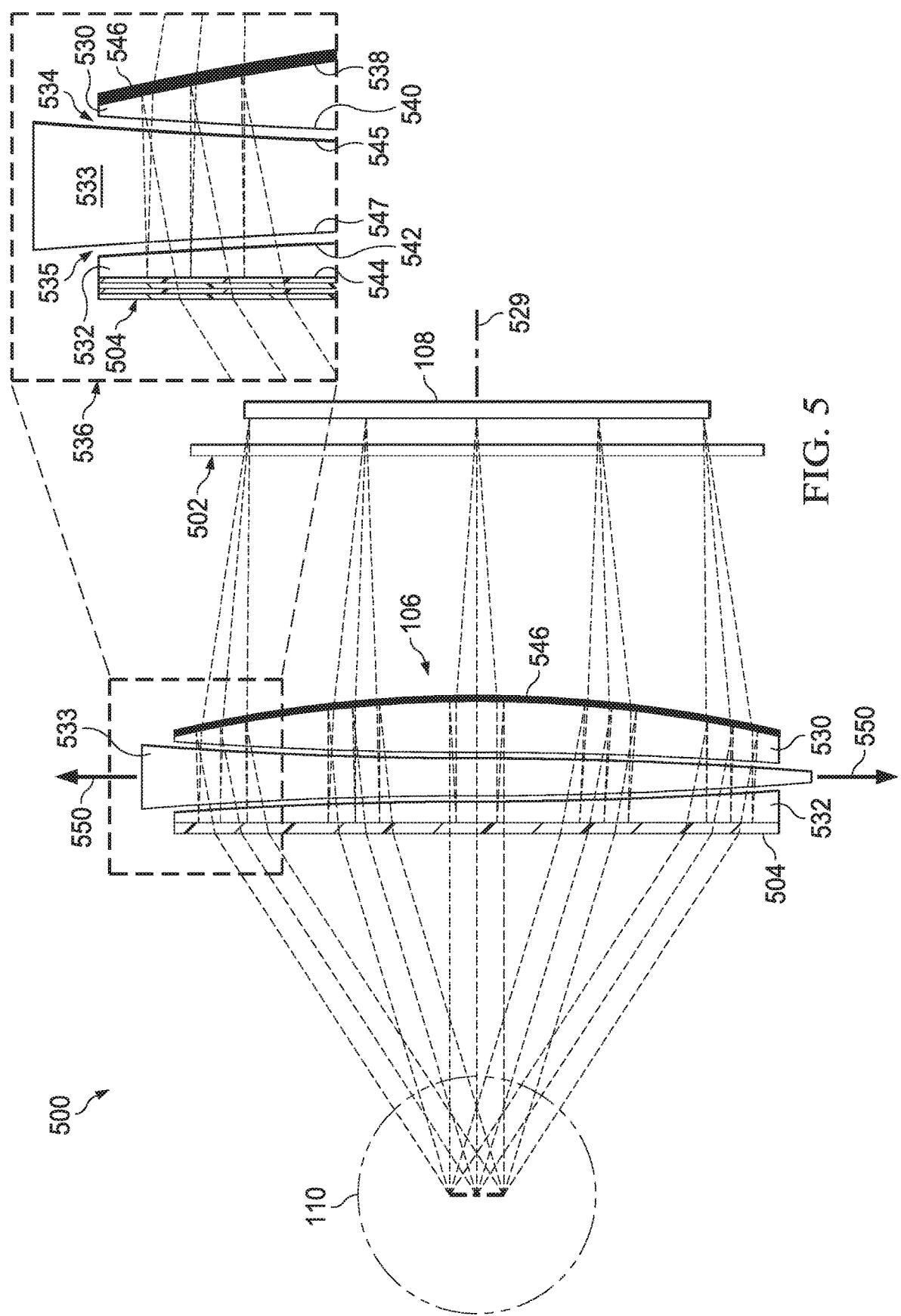
FIG. 5 illustrates a side cross-section view of an example of an optic system employing a three-element variable-focus catadioptric lens assembly for providing focus tuning according to some embodiments.

FIG. 5 illustrates another optical system 500 having a tunable focal length in accordance with some embodiments. The optical system 500 includes a first polarization filter 502 (hereinafter, "input filter 502"), a second polarization filter (hereinafter, "output filter 504"), and a catadioptric lens assembly (CLA) 506 disposed therebetween. The optical system 500 is disposed between the display panel 108 and an expected position of a user's eye 110, such that the input filter 502 faces the display panel 108 and the output filter 504 faces the eye 110. In one embodiment, the filters 502, 504 are configured with the same layers as filters 102, 104, respectively, of optical system 100, as described above.

The light path folding aspects and focus tuning through lateral translation of a lens element as described above apply in a corresponding manner to the optical system 500. However, the CLA 506 of optical system 500 is a three-element system, having a display-facing lens element 530, an eye-facing lens element 532, and an intermediary lens element 533 disposed along an optical axis 529 of the CLA 506 with a gap 534 between lens elements 530 and 533 and a gap 535 between the lens elements 533 and 532. As illustrated by enlarged view 536, the display-facing lens element 530 has a display-facing surface 538 and an opposing eye-facing surface 540, and the eye-facing lens element 532 has a display-facing surface 542 and an opposing eye-facing surface 544, and the intermediary lens element 533 has a display-facing surface 545 and an opposing eye-facing surface 547. As such, the opposing surfaces 540, 545 define the gap 534 separating the lens elements 530, 533, while the opposing surfaces 542, 547 define the gap 535 separating the lens elements 532, 533. In one embodiment, the output filter 504 is laminated on, or otherwise disposed at, the eye-facing surface 544. The CLA 506 further includes a partial mirror 546 disposed at the display-facing surface 538 of the lens element 530.

As with the CLAs 106, 406 of optical systems 100, 400, a system employing the optical system 500 may implement a mechanism to laterally translate the intermediary lens element 533 in one or more directions 550 relative to the lens elements 530, 532 so as to change an optical profile, and thus optical power and focal length, of the resulting configuration. In this approach, the freeform surfaces that provide variable power are implemented on the opposing surfaces defining the gaps between lens elements. As such, the eye-facing surface 540 of the lens element 530 comprises a freeform curvature having a sag based on, for example, a cubic function (and may be further based on higher-order terms for addressing aberrations) and the opposing display-facing surface 545 of the lens element 533 comprises a freeform curvature that has a sag based on, for example, a cubic function (and may be further based on higher-order terms) and which is compatible with (e.g., inverse of) the curvature of the surface 540. Further, the eye-facing surface 547 comprises a freeform curvature having a sag based on, for example, a cubic function (and may be further based on higher-order terms) and the opposing display-facing surface 542 of the lens element 532 comprises a freeform surface having a sag based on, for example, a cubic function (and may be further based on higher-order terms) and which is compatible with the curvature of the opposing surface 547. In some embodiments, the sag of each of these internal surfaces is configured so that the power is the same for both gap regions, whereas in other embodiments the sags are configured so that the power is asymmetric across the gap regions. As for the external surfaces, the eye-facing surface 544 of the lens element 532 may be implemented as a plano surface, and the display-facing surface 538 of the lens element 530 may be implemented with, for example, a sag based on a rotationally symmetric asphere with a conic constant.

With this configuration and the additional back reflection provided by the input and output filters 502, 504, display light from the display panel 108 passes through both viable power regions of the CLA 506 three times. As such, the required sag or curvature of the surfaces is reduced even compared to the required sag for the two-element CLAs described above. Moreover, depending on the implementation, this also can reduce the amount of lateral translation required to achieve a desired focal length. Further, splitting the variable power provided by the CLA 506 between two gap regions can result in improved image quality compared to the single gap region implementations of CLAs 106 and 406 as more surfaces yield more degrees of freedom for the optical designer to optimize.

Figure 6:
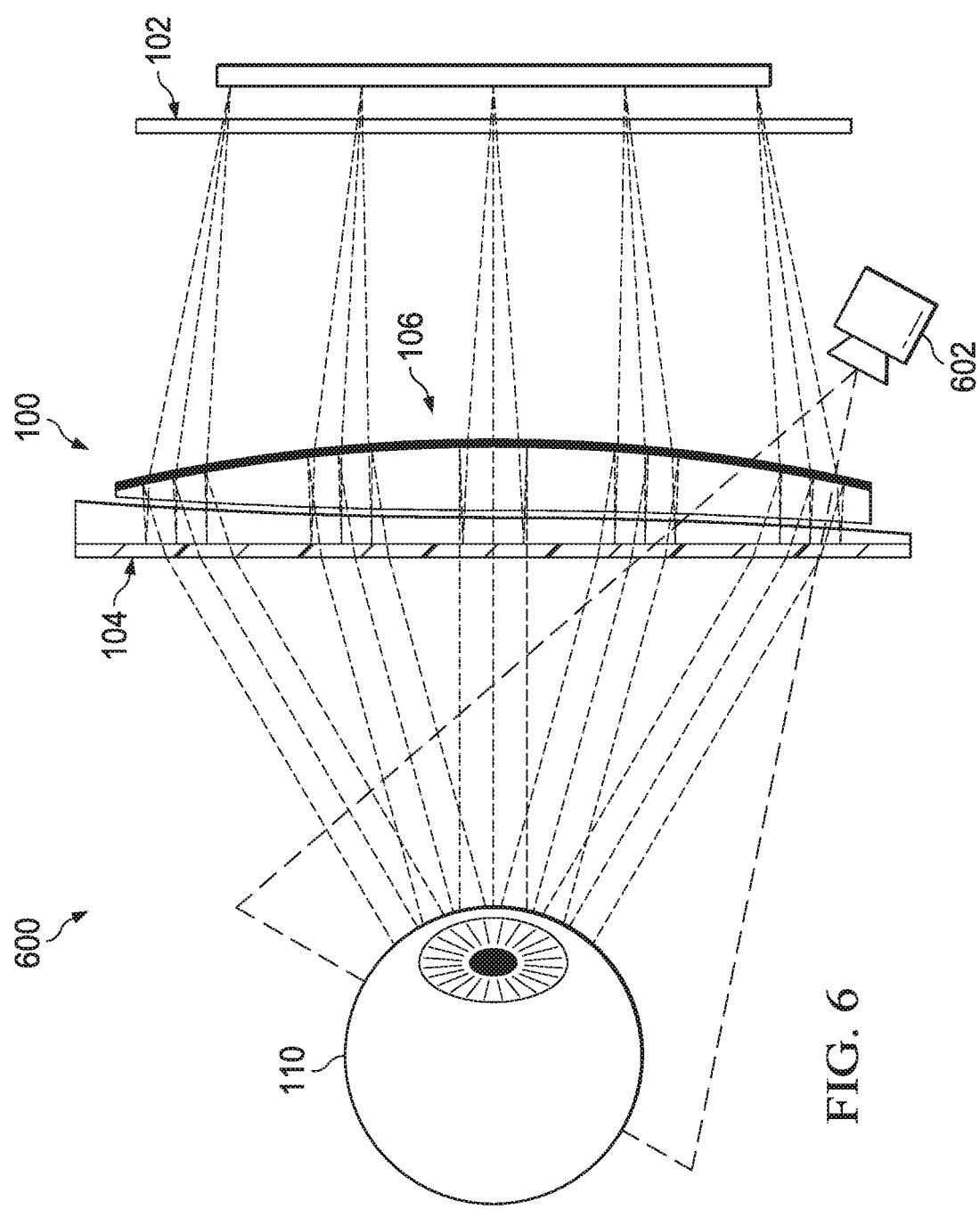
FIG. 6 illustrates a side cross-section view of an example eye-tracking implementation in an optic system having a variable-focus catadioptric lens assembly according to some embodiments.
Figure 7:
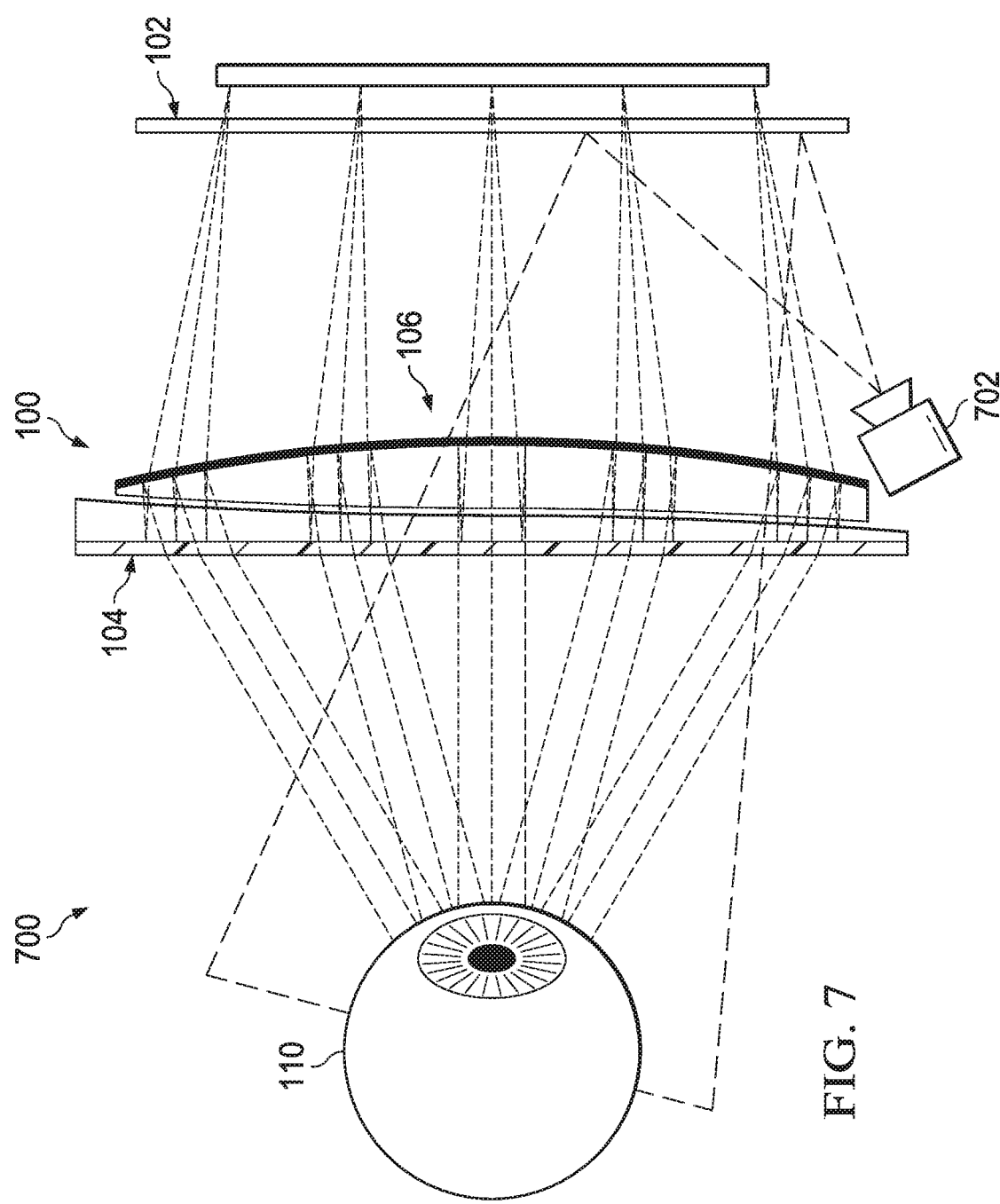
FIG. 7 illustrates a side cross-section view of another example eye-tracking implementation in an optic system having a variable-focus catadioptric lens assembly according to some embodiments.

FIGS. 6 and 7 illustrate example gaze tracking configurations for use with an optical system having tunable focus in accordance with some embodiments. HMDs and other near-eye display systems frequently utilize a gaze tracking system to track the gaze direction of one or both of a user's eyes. The tracked gaze direction may be used, for example, to foveate a view based on a display region identified from the gaze direction, or to otherwise control the display image rendering operation. Such gaze tracking systems typically include an infrared light source or other light source to illuminate the user's eye, a camera to capture imagery of the illuminated eye, and a processing component to process the captured imagery to determine current gaze direction. As illustrated by configuration 600 of FIG. 6, a system employing an optical system as described herein (using optical system 100 as an example) can position the gaze-tracking camera 602 at a periphery between the input filter 102 and the CLA 106, with the gaze-tracking camera 602 focused on the user's eye 100 through the CLA 106 and the output filter 104 so that the gaze-tracking camera 602 directly captures light reflected off of the user's eye. Alternatively, as illustrated by configuration 700 of FIG. 7, a system employing the optical system can position a gaze tracking camera 702 at a periphery between the input filter 102 and the CLA 106, with the gaze tracking camera 702 focused on the eye-facing side 117 of the input filter 102 so as to capture imagery of the eye 110 indirectly through capture of infrared (IR) light from the eye 110 that is reflected off of a dichroic film or coating that transmits visible light and reflects infrared light in the spectrum used for eye tracking. In such instances, the IR light may be directed toward the eye using one or more IR light emitting diodes (LEDs) disposed, for example, around the outer diameter of the illustrated lens assembly, and aimed at the user's eye 110, with the output filter 104 being substantially transparent to the IR light.

Figure 8:
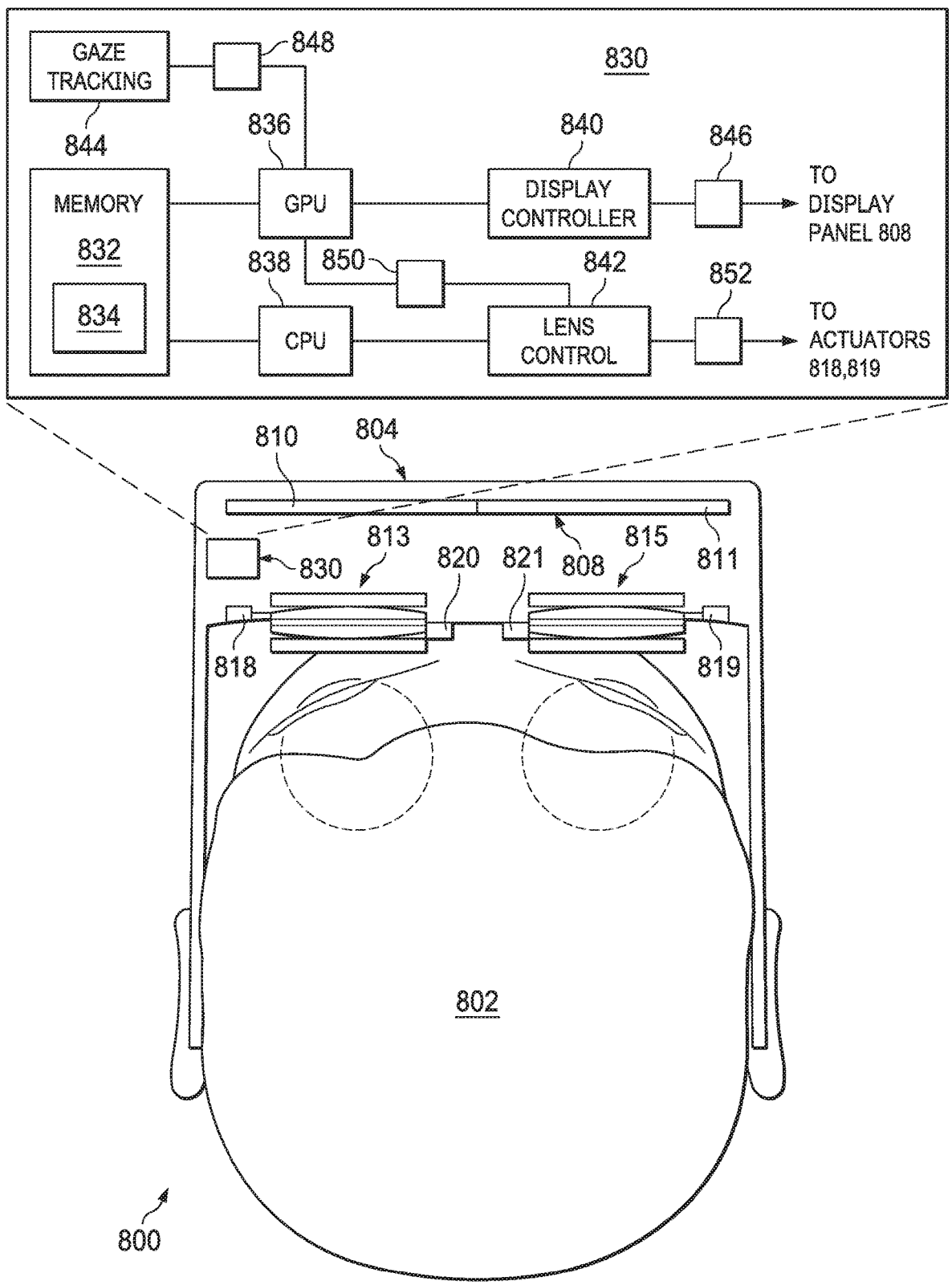
FIG. 8 illustrates a top cross-section view of a near-eye display system employing an optic system having a variable-focus catadioptric lens assembly in accordance with some embodiments.

FIG. 8 illustrates a top cross-section view of a near-eye display system 800 configured to provide virtual reality, augmented reality, or mixed reality functionality in accordance with some embodiments. The system 800 may be implemented as a portable user device, such as an HMD, a tablet computer, computing-enabled cellular phone (e.g., a "smartphone"), a notebook computer, a personal digital assistant (PDA), a gaming console system, and the like. In other embodiments, the electronic device 505 can include a fixture device, such as medical imaging equipment, a security imaging sensor system, an industrial robot control system, a drone control system, and the like. For ease of illustration, the system 800 is generally described herein in the example context of an HMD device and thus is also referred to as "HMD 800"; however, the system 800 is not limited to these example implementations.

The HMD 800 is depicted as being mounted on a head 802 of a user. As illustrated, the HMD 800 includes a housing 804 that includes a display panel 808 that generates an image for presentation to the user, and is one embodiment of the display panel 108. The display panel 808 provides a left display 810 and a right display 811 that are used to display stereoscopic images to a corresponding left eye and right eye of the user. In other embodiments, separate display panels are used to provide each of the left-eye and right-eye displays 810, 811.

The HMD 800 further includes eyepiece optical systems 813, 815 disposed in corresponding apertures or other openings in a user-facing surface 816 of the housing 804, for the left eye and right eye, respectively, of the user. The optical systems 813, 815 each implement an optical system that utilizes input and output filters to fold the light path around a variable catadioptric lens assembly, such as the optical system 100 of FIG. 1, the optical system 400 of FIG. 4, and the optical system 500 of FIG. 5. To this end, the HMD 800 further includes actuators 818, 819 for the optical systems 813, 815, respectively, which are configured to laterally translate the corresponding moveable lens element (e.g., lens element 132, 432, 533) of the corresponding CLA so as to tune the focus of the corresponding optical system. The actuators 818, 819 can comprise, for example, motor servos, electromagnetic actuators, screw-drive-based actuators, voice-coil actuators, and the like. Further, the HMD 800 can include one or more gaze-tracking cameras, such as gaze-tracking cameras 820, 821 for the left eye and right eye, respectively.

The HMD 800 further includes, or is in wired or wireless communication with, an electronic subsystem 830 that provides display imagery for display at the display panel 808 and otherwise controls operation of the HMD 800. In the depicted example, the electronic subsystem 830 includes a system memory 832 to store one or more software applications 834, one or more processors to execute the one or more software applications 834, such as a central processing unit (CPU) 838 and a graphics processing unit (GPU) 836, a display controller 840 to control the display panel 808, a lens control module 842 to control the actuators 818, 819, and a gaze tracking module 844 to track the gaze direction of the user's eyes. The modules 842, 844 each may be implemented as software executed by one or both of the CPU 838 or GPU 836 (e.g., as part of the software application 834), as hardcoded logic (e.g., an application specific integrated circuit (ASIC)), programmable logic (e.g., a field programmable gate array (FPGA)), or a combination thereof.

In operation, the CPU 838 and GPU 836 coordinate through execution of one or more software applications 834 to render a sequence of pairs of display images 846 provided via the display controller 840 for display at the left-eye and right-eye displays 810, 811 of the display panel 808 so as to present stereoscopic VR or AR display content to the user. To this end, the CPU 838 or GPU 836 may obtain current gaze direction information 848 from the gaze tracking module 844 (which determines the gaze direction from eye imagery captured via the cameras 820, 821 using any of a variety of well-known techniques), and use this gaze direction information 848 to control rendering of one or more corresponding pairs of display images 846.

Further, in at least one embodiment, for each display image 846 being rendered by the GPU 836, the GPU 836 determines a focal depth parameter 850 or other depth information for the display image 846. The focal depth parameter 850 may represent, for example, various forms of depth information, such as an average depth of objects in the entire display image 846 (e.g., by averaging all of the pixel depth values or geometric primitive depth values in a Z buffer or depth buffer associated with the display image 846), a center field depth, an average depth of an image region that is the target or focus of the current gaze point, the depth of an object of prominence in the display image 846, and the like. More generally, the focal depth parameter 850, in some embodiments, represents the ideal focal depth for the optic systems 813, 815 when viewing the corresponding pair of display image 846 so as to reduce or eliminate the potential for vergence-accommodation conflict. Further, when the mechanical actuation, frame rate (frames/second or fps), and rendering are sufficiently fast, multiple depth planes can be displayed rapid succession to enable a multi-focal display system. Thus, the lens control module 842 utilizes this focal depth parameter 850 to determine a corresponding amount of lateral translation of the movable lens elements of the CLAs of the optical systems 813, 815 that would alter the optical power of the CLAs sufficiently to provide a commensurate focal length for the optical systems 813, 815. The lens control module 842 then generates signaling 852 that triggers the actuators 818, 819 to laterally translate the movable lens elements by the identified amount, and thus configure the optical systems 813, 815 for an optical power and focal length better tuned to the pair of display images 846 being displayed at that point. This process then may repeat for each pair of display images 846, each set of X display images 846 (X>1), and the like.

Figure 9:
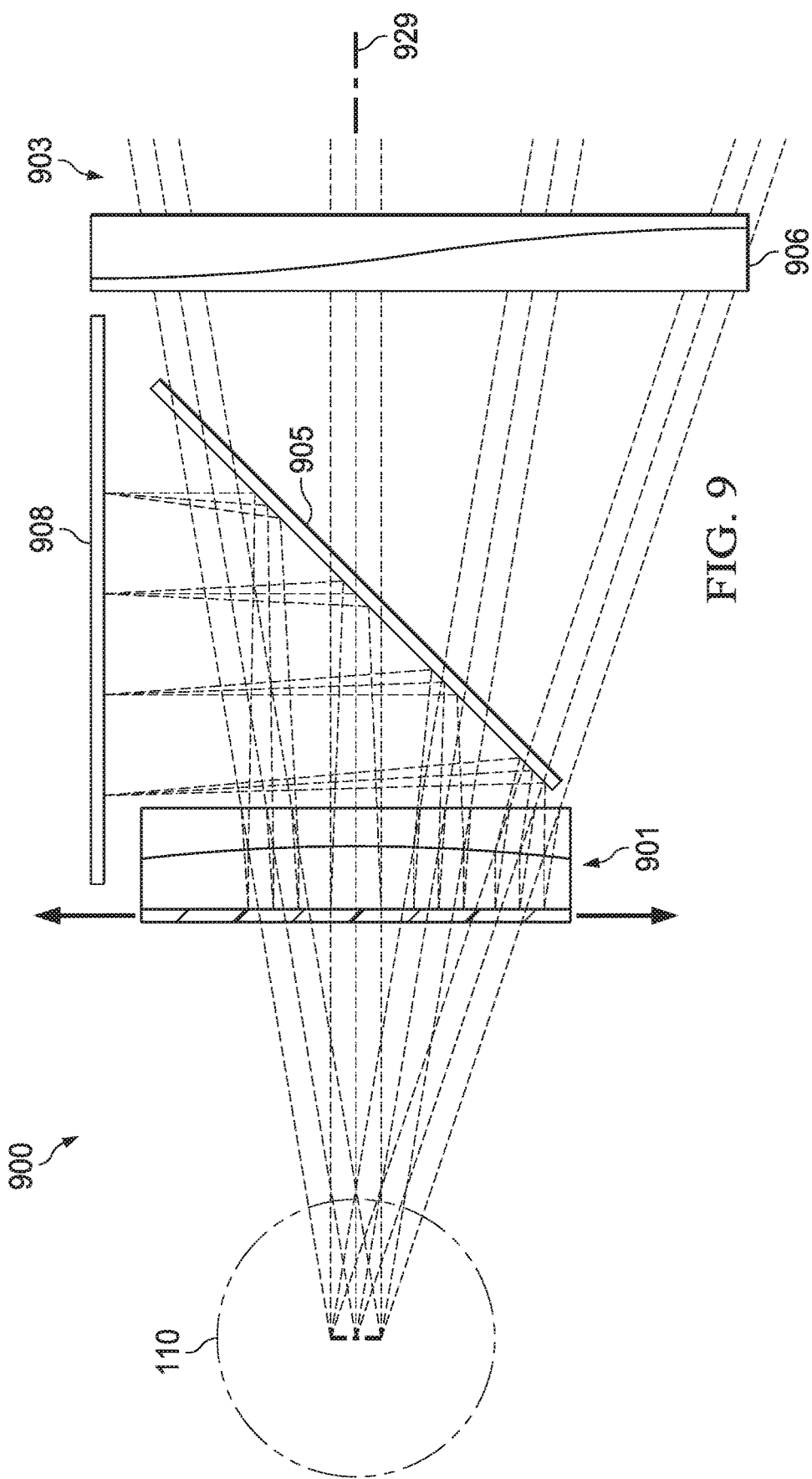
FIG. 9 illustrates a side cross-section view of an augmented reality display system employing an optic system having a variable-focus catadioptric lens assembly in accordance with some embodiments.

FIG. 9 illustrates a side cross-section view of an AR-based near-eye display system 900 utilizing a focus-tunable optical system 901 in accordance with some embodiments. The optical system 902 comprises a polarization-based light path folding system having a focus-tunable catadioptric lens assembly, such as the optic systems 100, 400, and 500 described above. In the illustrated embodiment, a display panel 908 is oriented along a plane that is perpendicular to an optical axis of the eye 110 of the user and the optical axis 929 of the optical system 901, and thus the display panel 908 is in a plane orthogonal to the plane of the optical system 901. This configuration places the display panel 908 outside of the user's field of view (FOV) and thus allows the user to perceive ambient light 903 (i.e., "see-through light") originating from the environment in front of the user. In order to allow the ambient light to reach the user's eyes while also overlaying display light from the display panel 908 to provide an AR, or mixed reality, experience, the system 900 further includes a beam splitter 905 oriented at non-zero, or oblique, angles relative to the planes defined by the display panel 908 and the optic system 901. For example, the beam splitter 905 may be angled at 45 degrees relative to the display panel 908 and the optic system 901.

In this configuration, the beam splitter 905 also serves as the input filter of the optical system 901 in that the beam splitter 905 converts emitted display light from the display panel 108 from unpolarized light to circularly polarized light in the process of reflecting the display light toward the optical system 901. Moreover, the ambient light 903 is permitted to pass through the beam splitter 905 and be transmitted by the optic system 901 to the user eye along with the reflected display light. The system 900 includes some or all of the components of the electronic subsystem 830 for rendering display images for display at the display panel 908 and for controlling an actuator to laterally translate a movable lens element of the optical system 901 to tune the focus of the optical system 901. However, because the focus tuning of the display light also focus tunes the ambient light, in one embodiment, the system 900 further includes a see-through focus compensator in the form of second optical system 906 disposed between the beam splitter 905 and the aperture from which ambient light is received from the environment. The optical system 906 operates as a see-through compensator and represents, for example, a purely refractive optical system that employs two or more adjacent lens elements, at least one of which can be laterally translated relative to the one or more other lens elements so as to vary the optical power of the assembly (such as described above), and is controlled to adjust its optical power via lateral translation of its movable lens element so as to pre-compensate the incident ambient light for the focus tuning imparted by the optical system 901. To illustrate, the optical system 906 may employ a configuration of lens elements similar to the lens elements 130, 132 of FIG. 1, whereby the internally facing freeform surfaces are cubic functions (with the option for higher order terms) to as to pre-compensate for the impact on the ambient light 903 imparted by the optical system 901.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a first polarization filter configured to convert light to a first circular polarization;
a second polarization filter configured to reflect light having the first circular polarization and transmit light having a second circular polarization; and
a variable-power catadioptric lens assembly disposed between the first polarization filter and the second polarization filter and comprising a plurality of adjacent lens elements disposed along an optical axis of the variable-power catadioptric lens assembly, wherein the plurality of lens elements includes:
a first lens element having a partial mirror disposed at a first surface facing the first polarization filter and having a second surface opposite the first surface;
a second lens element having a third surface facing the second surface and an opposing fourth surface, the second lens element configured to be translated relative to at least one other lens element in a direction substantially orthogonal to the optical axis to change an optical power of the catadioptric lens assembly; and wherein:
the second surface and the third surface are separated by a gap;
the first surface comprises a freeform surface sag;
the second surface comprises a plano surface;
the third surface comprises a plano surface; and
the fourth surface comprises a freeform surface sag.

2. The apparatus of claim 1, wherein the first polarization filter comprises:
a first linear polarizer layer configured to convert light to a first linear polarization; and
a first quarter wave plate layer configured to convert the light from the first linear polarization to the first circular polarization.

3. The apparatus of claim 2, wherein the second polarization filter comprises:
a second quarter wave plate layer configured to convert the light from the first circular polarization to a second linear polarization that is transverse to the first linear polarization;
a reflective polarizer layer configured to transmit light having the first linear polarization and reflect light having the second linear polarization; and
a linear polarizer layer configured to transmit light having the second linear polarization.

4. The apparatus of claim 1, wherein the gap is one of: an air-filled gap; and a fluid-filled gap.

5. The apparatus of claim 1, further comprising:
a display panel configured to emit display light representative of a display image toward the first polarization filter;
an actuator configured to translate the second lens element relative to at least the first lens element; and
a lens control module configured to manipulate an amount of translation of the second lens element by the actuator based on depth information associated with the display image.

6. The apparatus of claim 5, wherein:
the depth information is determined based on at least one of: a center field depth; an averaging of depth values of a depth buffer associated with the display image; a gaze point of eyes of a user; and a vergence of the eyes of the user.

7. The apparatus of claim 5, further comprising:
a gaze tracking camera disposed between the first polarization filter and the catadioptric lens assembly and configured to capture imagery of an eye for gaze tracking, and wherein the gaze tracking is one of: aimed directly at the eye through the catadioptric lens assembly and second polarizer filter; or aimed at an at least partially reflective eye-facing side of the first polarization filter.

8. An apparatus comprising:
a first polarization filter configured to convert light to a first circular polarization;
a second polarization filter configured to reflect light having the first circular polarization and transmit light having a second circular polarization; and
a variable-power catadioptric lens assembly disposed between the first polarization filter and the second polarization filter and comprising a plurality of adjacent lens elements disposed along an optical axis of the variable-power catadioptric lens assembly, wherein the plurality of lens elements includes:
a first lens element having a partial mirror disposed at a first surface facing the first polarization filter and having a second surface opposite the first surface;

a second lens element having a third surface facing the second surface and having an opposing fourth surface, the second lens element configured to be translated relative to at least one other lens element in a direction substantially orthogonal to the optical axis to change an optical power of the catadioptric lens assembly;
a third lens element having a fifth surface facing the fourth surface and an opposing sixth surface;
wherein the second surface and the third surface are separated by a first gap; and
wherein the fourth surface and the fifth surface are separated by a second gap.

9. The apparatus of claim 8, wherein:
the second surface comprises a freeform surface sag;
the third surface comprises a freeform surface sag that is an inverse complement of the freeform surface sag of the second surface; and
the fourth surface comprises a plano surface.

10. The apparatus of claim 8, wherein:
the second surface comprises a freeform surface sag;
the third surface comprises a freeform surface sag that is an inverse complement of the freeform surface sag of the second surface;
the fourth surface comprises a freeform surface sag;
the fifth surface comprises a freeform surface sag that is an inverse complement of the freeform surface sag of the fourth surface; and
the sixth surface comprises a plano surface.

11. The apparatus of claim 10, wherein the second lens element is configured to be translated relative to the first lens element and the third lens element.

12. The apparatus of claim 8, further comprising:
a display panel configured to emit display light representative of a display image toward the first polarization filter;
an actuator configured to translate the second lens element relative to at least the first lens element; and
a lens control module configured to manipulate an amount of translation of the second lens element by the actuator based on depth information associated with the display image.

13. The apparatus of claim 12, wherein:
the depth information is determined based on at least one of: a center field depth; an averaging of depth values of a depth buffer associated with the display image; a gaze point of eyes of a user; and a vergence of the eyes of the user.

14. The apparatus of claim 12, further comprising:
a gaze tracking camera disposed between the first polarization filter and the catadioptric lens assembly and configured to capture imagery of an eye for gaze tracking, and wherein the gaze tracking is one of: aimed directly at the eye through the catadioptric lens assembly and second polarizer filter; or aimed at an at least partially reflective eye-facing side of the first polarization filter.

15. A method comprising:
providing a near-eye display system comprising a display panel, a first polarization filter facing the display panel and configured to convert light to a first circular polarization, a second polarization filter configured to reflect light having the first circular polarization and transmit light having a second circular polarization, and a variable-power catadioptric lens assembly disposed between the first polarization filter and the second polarization filter and comprising a plurality of adjacent lens elements disposed along an optical axis of the variable-power catadioptric lens assembly, the plurality of lens elements including a first lens element having a partial mirror disposed at a first surface facing the first polarization filter and having an opposing second surface and a second lens element having a third surface facing the second surface and having an opposing fourth surface and configured to be translated relative to the first lens element in a direction substantially orthogonal to the optical axis, the first surface comprises a freeform surface sag, wherein the second surface and third surface are separated by a gap, the second surface comprises a plano surface, the third surface comprises a plano surface, and the fourth surface comprises a freeform surface sag;
emitting, at the display panel, display light representative of a display image; and
adjusting an amount of lateral translation of the second lens element to change an effective focal length by which a user views the display image through the catadioptric lens assembly.

16. The method of claim 15, wherein adjusting the amount of lateral translation of the second lens element comprises adjusting the amount of lateral translation based on depth information for the display image.

17. The method of claim 16, further comprising:
the depth information is determined based on at least one of: a center field depth; an averaging of depth values of a depth buffer associated with the display image; a gaze point of eyes of the user; and a vergence of the eyes of the user.

18. The method of claim 17, further comprising:
tracking a gaze direction of an eye of the user based on captured imagery of the eye; and
wherein the gaze direction is used to at least one of: render the display image; and
determine the depth information based on a region of the display image identified based on the gaze direction.

19. An augmented reality (AR) display system comprising:
a display panel oriented in a first plane and configured to emit display light representative of a display image;
a first optic system disposed at a first side of the display panel and oriented in a second plane that is substantially orthogonal to the first plane, wherein the first optic system comprises:
a first polarization filter configured to convert light to a first circular polarization;
a second polarization filter configured to reflect light having the first circular polarization and transmit light having a second circular polarization; and
a variable-power catadioptric lens assembly disposed between the first polarization filter and the second polarization filter;
a beam splitter disposed at an oblique angle relative to first optic system and the display panel, the beam splitter configured to reflect the display light from the display panel toward the first optic system and to transmit ambient light toward the first optic system;
a lens control module to configure an optical power of the variable-power catadioptric lens assembly for user viewing of the display image; and
a second optical system disposed at a second side of the display panel and oriented in a third plane that is substantially orthogonal to the first plane and having a variable power, the second optical system configured to pre-compensate for focus tuning imposed on the ambient light by the first optic system.

20. The AR display system of claim 19, wherein the lens control module is to configure the optical power of the variable-power catadioptric lens assembly based on depth information for the display image.

21. The AR display system of claim 19, wherein:
the variable-power catadioptric lens assembly comprises a first lens element and a second lens element disposed along an optical axis of the variable-power catadioptric lens assembly, wherein:
the first lens element comprises a first surface and an opposing second surface;
the second lens element comprises a third surface facing the second surface and an opposing fourth surface;
the second surface and the third surface are separated by a gap; and
the second lens element is configured to be translated relative to the first lens element in a direction orthogonal to the optical axis to change an optical power of the catadioptric lens assembly.

22. The AR display system of claim 21, wherein:
the second surface comprises a freeform surface sag;
the third surface comprises a freeform surface sag that is an inverse complement of the freeform surface sag of the second surface; and
the fourth surface comprises a plano surface.

23. The AR display system of claim 21, wherein:
the first surface comprises a freeform surface sag;
the second surface comprises a plano surface;
the third surface comprises a plano surface; and
the fourth surface comprises a freeform surface sag.

24. An augmented reality (AR) display system comprising:
a display panel oriented in a first plane and configured to emit display light representative of a display image;
a first optic system disposed at a first side of the display panel and oriented in a second plane that is substantially orthogonal to the first plane, wherein the first optic system comprises:
a first polarization filter configured to convert light to a first circular polarization;
a second polarization filter configured to reflect light having the first circular polarization and transmit light having a second circular polarization; and
a variable-power catadioptric lens assembly disposed between the first polarization filter and the second polarization filter;
a beam splitter disposed at an oblique angle relative to first optic system and the display panel, the beam splitter configured to reflect the display light from the display panel toward the first optic system and to transmit ambient light toward the first optic system;
a lens control module to configure an optical power of the variable-power catadioptric lens assembly for user viewing of the display image; and
wherein the variable-power catadioptric lens assembly comprises a first lens element, a second lens element, and a third lens element disposed along an optical axis of the variable-power catadioptric lens assembly, wherein:
the first lens element comprises a first surface and an opposing second surface;
the second lens element comprises a third surface facing the second surface and an opposing fourth surface;
the third lens element comprises a fifth surface facing the fourth surface and an opposing sixth surface;
the second surface and the third surface are separated by a first gap;
the fourth surface and the fifth surface are separated by a second gap;
the second surface comprises a freeform surface sag;
the third surface comprises a freeform surface sag that is an inverse complement of the freeform surface sag of the second surface;
the fourth surface comprises a freeform surface;
the fifth surface comprises a freeform surface sag that is an inverse complement of the freeform surface sag of the fourth surface;
the sixth surface comprises a plano surface; and
the second lens element is configured to be translated relative to the first and third lens elements in a direction orthogonal to the optical axis so as to change an optical power of the variable-power catadioptric lens assembly.

* * * * *